United States Patent
Ehrlich et al.

(10) Patent No.: US 8,025,331 B2
(45) Date of Patent: Sep. 27, 2011

(54) ROOF ASSEMBLY FOR A STORAGE CONTAINER

(75) Inventors: Rodney P. Ehrlich, Monticello, IN (US); Will Lewallen, Pine Village, IN (US)

(73) Assignee: Wabash National, L.P., Lafayette, IN (US)

( * ) Notice: Subject to any disclaimer, the term of this patent is extended or adjusted under 35 U.S.C. 154(b) by 39 days.

(21) Appl. No.: 12/400,384

(22) Filed: Mar. 9, 2009

(65) Prior Publication Data
US 2009/0230727 A1 Sep. 17, 2009

Related U.S. Application Data

(60) Provisional application No. 61/037,108, filed on Mar. 17, 2008.

(51) Int. Cl.
*B62D 25/06* (2006.01)
(52) U.S. Cl. ............ 296/185.1; 296/100.01; 296/100.02
(58) Field of Classification Search .................. 296/98, 296/100.01, 100.02, 185.1; 52/17; 105/404, 105/406.1
See application file for complete search history.

(56) References Cited

U.S. PATENT DOCUMENTS

| | | | |
|---|---|---|---|
| 874,939 A | 12/1907 | Clayton et al. | |
| 950,356 A * | 2/1910 | Tatum | 105/404 |
| 1,388,600 A * | 8/1921 | Posson | 105/404 |
| 1,579,673 A * | 4/1926 | Tench et al. | 105/404 |
| 1,630,483 A * | 5/1927 | Franck | 105/404 |
| 2,092,277 A * | 9/1937 | Gilpin | 105/404 |
| 2,225,170 A * | 12/1940 | Gilpin | 105/404 |
| 2,243,113 A * | 5/1941 | Mussey et al. | 105/404 |
| 2,934,372 A | 4/1960 | Jewell et al. | |
| 3,637,252 A * | 1/1972 | Metsker | 105/404 |
| 3,690,272 A * | 9/1972 | Ogle et al. | 105/404 |
| 3,825,297 A * | 7/1974 | Barenyi | 296/210 |
| 3,914,916 A | 10/1975 | Simpson et al. | |
| 4,940,279 A | 7/1990 | Abott et al. | |
| 5,799,462 A | 9/1998 | McKinney | |
| 5,876,089 A | 3/1999 | Ehrlich | |
| 5,938,274 A | 8/1999 | Ehrlich | |
| 6,227,125 B1 * | 5/2001 | Schroeder et al. | 105/401 |
| 6,761,840 B2 * | 7/2004 | Fecko et al. | 105/404 |
| 6,904,848 B2 * | 6/2005 | Norton et al. | 105/404 |
| 2007/0200393 A1 | 8/2007 | Riley et al. | |

OTHER PUBLICATIONS

Trailer Body Builders .Com, "Bound to Last," Online Article, Jul. 1, 2004, 4 pages, http://trailer-bodybuilders.com/mag/trucks_bound_last/ (4 pages).

Protest Under 37 CFR 1.291(a), filed Nov. 12, 2010 in this patent application which was submitted by Great Dane Limited Partnership by law firm Clark Hill PLC. (14 pages).

* cited by examiner

*Primary Examiner* — Lori L Lyjak

(57) ABSTRACT

A roof assembly is provided for a storage container having two opposing side walls that together define a length of the storage container. The roof assembly includes a plurality of roof panels arranged atop and between the two opposing side walls along the length of the storage container in side-by-side relationship. Each of the plurality of roof panels has opposite sides and opposite ends. Each of the opposite ends of the plurality of roof panels is configured to be secured to a top of a corresponding one of the two opposing side walls of the storage container. Each of the opposite sides of each of the plurality of roof panels is configured to be attached to the side of an adjacent one of the plurality of roof panels.

22 Claims, 3 Drawing Sheets

ROOF ASSEMBLY FOR A STORAGE CONTAINER

CROSS REFERENCE TO RELATED APPLICATION

This patent application claims priority to, and the benefit of, U.S. Provisional Patent Application No. 61/037,108 filed Mar. 17, 2008, the disclosure of which is incorporated herein by reference.

FIELD OF THE INVENTION

The present invention relates generally to storage containers such as mobile storage containers, and more specifically to roof structures for such storage containers.

BACKGROUND

Conventional roofs for storage containers, and particularly for mobile storage containers, may be provided in various forms. For example, in conventional box or van-type trailers, a roof assembly may include a number of roof bows extending between and along the trailer side walls and a flexible sheet or cover supported by the roof bows. It is desirable to improve storage container roofing technology generally, and particularly roofing technology for transportable storage containers.

SUMMARY

The present invention may comprise one or more of the features recited in the attached claims, and/or one or more of the following features and combinations thereof. A roof assembly is provided for a storage container having two opposing side walls that together define a length of the storage container. The roof assembly may comprise a plurality of roof panels arranged atop and between the two opposing side walls along the length of the storage container in side-by-side relationship. Each of the plurality of roof panels may have opposite sides and opposite ends. Each of the opposite ends of the plurality of roof panels may be configured to be secured to a top of a corresponding one of the two opposite side walls of the storage container. Each of the opposite sides of each of the plurality of roof panels may be configured to be attached to the side of an adjacent one of the plurality of roof panels.

A portion of each of the plurality of roof panels between the opposite ends thereof extends above each of the opposite ends when secured to the opposing side walls of the storage container.

The storage container may have a front wall connected between the two opposing side walls at one end thereof and a rear frame connected between the two opposing side walls at an opposite end thereof. One of the opposite sides of one of the plurality of roof panels may be positioned adjacent to a top of the front wall and configured to be secured to the top of the front wall. One of the opposite sides of one of the plurality of roof panels may be positioned adjacent to a top of the rear frame and configured to be secured to the top of the rear frame. A portion of each of the plurality of roof panels between the opposite ends thereof extends above each of the opposite ends when secured to the opposing side walls of the storage container. Each of the plurality of roof panels may be bowed between the opposite ends thereof such that the roof assembly is dome-shaped along a longitudinal axis defined by the trailer centrally between the two opposing side walls.

The trailer may further include a first top rail attached to one of the opposing side walls of the storage container along the top thereof and a second top rail attached to the other of the opposing side walls of the storage container along the top thereof. The opposite ends of each of the plurality of roof panels may be configured to be mounted to a corresponding one of the first and second top rails. In one illustrative embodiment, the opposite ends of each of the plurality of roof panels may be configured to be mounted to a corresponding one of the first and second top rails via a number of fixation members. For example, the number of fixation members may comprise rivets. Alternatively, the opposite ends of each of the plurality of roof panels may be configured to be mounted to a corresponding one of the first and second top rails via a bonding medium. For example, the bonding medium may comprise adhesive.

In one illustrative embodiment, each of the plurality of roof panels may comprise a core member, a first skin on one surface of the core member and a second skin on an opposite surface of the core member. Abutting sides of adjacent ones of the plurality of roof panels may be configured to be attached together by overlapping the first skin along the adjacent side of one of the adjacent roof panels onto the other adjacent roof panel and overlapping the second skin along the adjacent side of the other adjacent roof panel onto the one of the adjacent roof panels. The first skin along the adjacent side of the one of the adjacent roof panels may further be bonded to the other adjacent roof panel and the second skin along the adjacent side of the other adjacent roof panel may be bonded to the one of the adjacent roof panels. Alternatively, the roof assembly may further comprise a number of attachment structures each attached to abutting sides of adjacent ones of the plurality of roof panels to thereby attach the sides of the plurality of roof panels together.

In one illustrative embodiment, the one of the opposite sides of one of the plurality of roof panels may be configured to be secured to the top of the front wall via a number of fixation members. For example, the number of fixation members may comprise rivets. Alternatively, the one of the opposite sides of one of the plurality of roof panels may be configured to be secured to the top of the front wall via a bonding medium. For example, the bonding medium may comprise adhesive.

The storage container may comprise a transportable storage container configured to store one or more objects therein. For example, the storage container may comprise one of a towable trailer and a straight truck body.

At least one of the top surface and the bottom surface of at least one of the plurality of roof panels includes one or more embossments.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same. While the concepts of this disclosure are described in relation to trailers towed by motor vehicles, it will be understood that they are equally applicable to storage containers generally, and more specifically to transportable containers for transporting one or more objects, straight truck bodies, small personal and/or commercial trailers, trailers mounted to motor vehicles, and the like.

Figure 1:
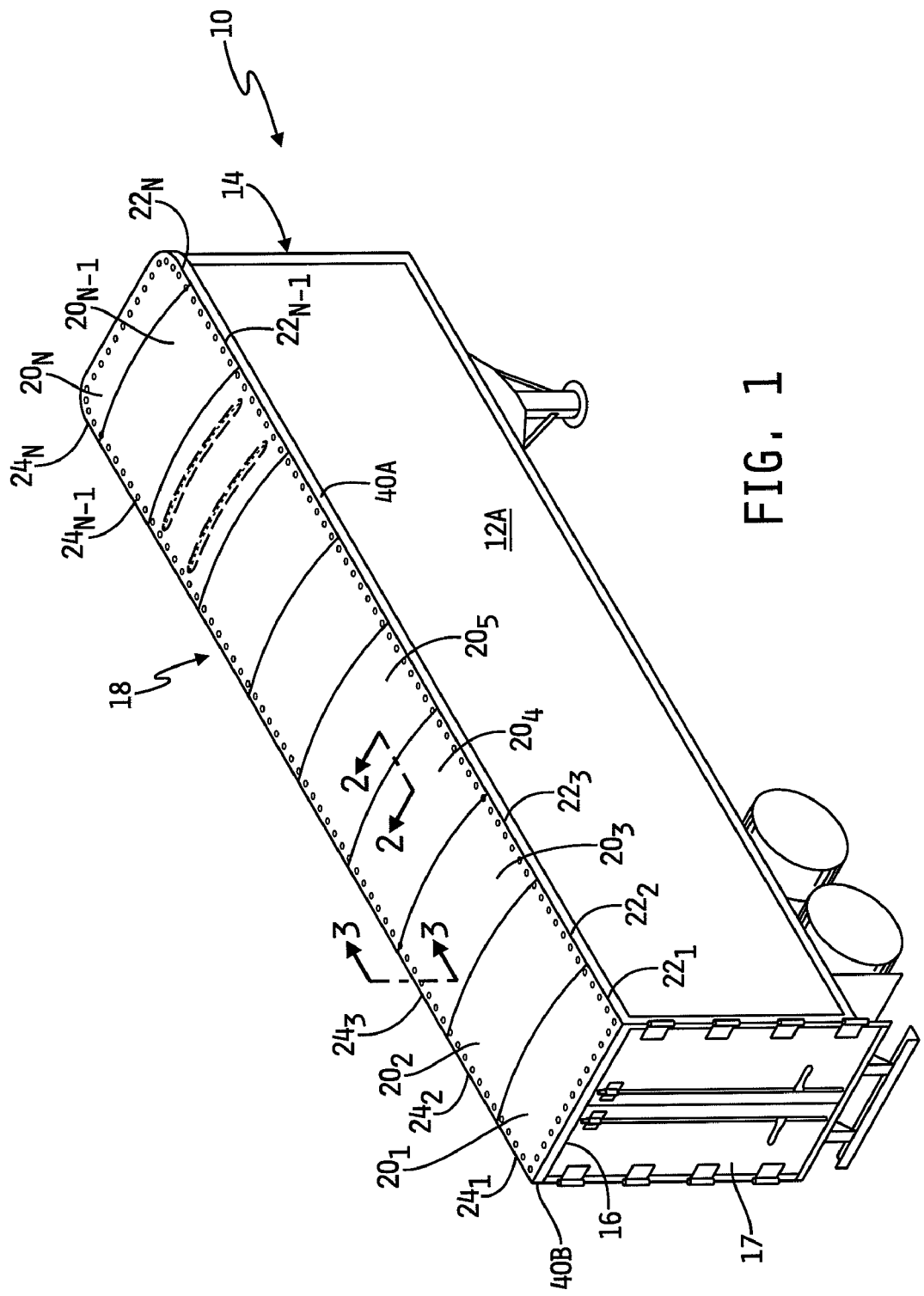
FIG. 1 is a perspective view of one illustrative embodiment of a roof assembly for a trailer.

Referring now to FIG. 1, a perspective view is shown of one illustrative embodiment of a roof assembly 18 for a trailer 10. Illustratively, the trailer 10 is a conventional box or van type trailer that is towable by a heavy duty truck, although it will be understood that the roof assembly 18 may be mounted to other trailer types and/or to other storage containers generally. In the illustrated embodiment, the trailer 10 includes a pair of opposing side walls 12A and 12B (see also FIG. 4) that extend the length of the trailer 10, a front wall 14 attached to and between the side walls 12A and 12B at one end thereof and a rear frame 16 attached to and between the side walls 12A and 12B at an opposite end thereof. A conventional door assembly 17 is mounted to the rear frame 16.

The roof assembly 18 includes a plurality of individual and separate roof panels $20_1$-$20_N$ arranged in side-by-side relationship atop the trailer 10 and extending along the length of the trailer 10, wherein N may be any positive integer. The roof panels $20_1$-$20_N$ are configured to be joined together and secured generally to the tops of the side walls 12A, 12B, to the front wall 14 and to the rear frame 16. For example, each of the roof panels $20_1$-$20_N$ is attached at one end $22_1$-$22_N$ thereof along the top of the side wall 12A and at an opposite end $24_1$-$24_N$ along the top of the side wall 12B. In the illustrated embodiment, and as further illustrated in FIG. 3, the top of the side wall 12A is attached to and along a top rail 40A and the top of the sidewall 12B is attached to and along another top rail 40B. In this embodiment, the opposite ends $22_1$-$22_N$ and $24_1$-$24_N$ of the roof panels $20_1$-$20_N$ are attached to the top rails 40A and 40B respectively. In any case, one side, e.g., the free side, of the first roof panel $20_1$ is attached to the top of the rear frame 16, and one side, e.g., the free side, of the last roof panel $20_N$ is attached to the top of the front wall 14. Illustratively, the free sides of the roof panels $20_1$ and $20_N$ are attached to the tops of the rear frame 16 and front wall 14 respectively via a number of conventional fixation members, such as rivets, threaded nut/bolt combinations or the like, as illustrated in FIG. 1, although the free sides of the roof panels $20_1$ and $20_N$ may alternatively or additionally be attached to the tops of the rear frame 16 and front wall 14 respectively via a conventional bonding medium.

One or more of the roof panels $20_1$-$20_N$ may illustratively include one or embossments. For example, as illustrated by dashed-line representation in FIG. 1, the top surface of at least one of the roof panels $20_1$-$20_N$ includes two elongated embossments extending generally perpendicular to the top rails 40A and 40B. Alternatively, the one or more embossments may include any number of embossments that extend long the top surface of one or more of the roof panels $20_1$-$20_N$ along any desired orientation or with random orientation. Alternatively still, the top surface and/or the bottom surface of one or more of the roof panels $20_1$-$20_N$ may include one or more embossments. Any such embossments may illustratively be provided for the purpose of imparting strength, stiffness or rigidity, to the one or more roof panels $20_1$-$20_N$, although any such embossments may alternatively or additionally impart other properties to the one or roof panels $20_1$-$20_N$. The one or more embossments may be formed of, for example, metal or metal composite, thermoplastic or other plastic material, or other material(s).

Figure 2:
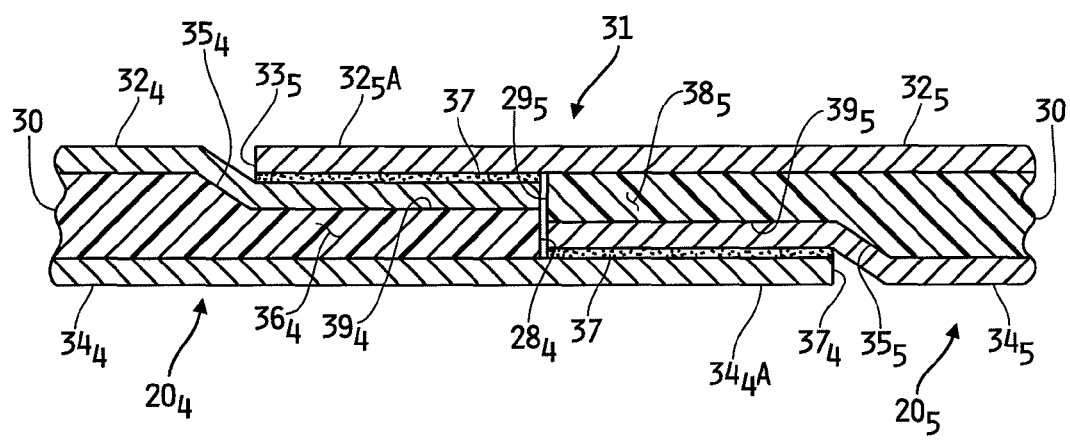
FIG. 2 is a cross-sectional view of the roof assembly as viewed along section lines 2-2 of FIG. 1.

Referring now to FIG. 2, a cross-sectional view is shown of the roof assembly 18 of FIG. 1, as viewed along section lines 1-1, to illustrate one illustrative embodiment of the joint 31 between two adjacent panels $20_4$ and $20_5$ of the roof assembly 18. It will be understood that the remaining panels of the roof assembly 18 are illustratively constructed in the same manner as will be described with respect to FIG. 2. Moreover, the joint 31 illustrated in FIG. 2 may also be used to join any or all adjacent roof panels $20_1$-$20_N$ of the roof assembly 18. In any case, the general form of the joint 31 between the adjacent panel sides $28_4$ and $29_5$ of FIG. 2 is known in the industry as a "shiplap" joint. In the illustrated embodiment, each of the roof panels $20_4$ and $20_5$ includes a core member 30 that is sandwiched between an outer skin 32 and an inner skin 34. The external surface of the outer skin 32 defines the outer surface of the roof panel, and the external surface of the inner skin 34 defines the inner surface of the roof panel. The core member 30 of each of the roof panels is illustratively formed of a non-metal material, although this disclosure contemplates embodiments in which the core member 30 may include at least some amount of a metallic material or materials. In one illustrative embodiment, the core member 30 is formed of a relatively light weight thermoplastic material, examples of which may include, but should not be limited to, polypropylene, high density polyethylene or the like, although other materials or material combinations for the core member 30 are contemplated. The outer and inner skins 32 and 34 respectively are each bonded to the opposite surfaces of the core member 30 using a conventional adhesive or other conventional bonding medium. The inner and outer skins 32 and 34 respectively may be formed of a metal or metallic composition, examples of which include, but should not be limited to, aluminum, galvanized steel, full hardened steel, such as AISI Grade E steel, or the like. In one illustrative embodiment, for example, the outer skin 32 is formed of ASTM G90 galvanized steel, and the inner skin 34 is formed of ASTM G40 galvanized steel. In alternative embodiments, the inner and/or outer skins 32 and 34 respectively may be formed of other rigid, semi-rigid, metallic or non-metallic materials.

In the specific embodiment illustrated in FIG. 2, the joint 31 between abutting sides $28_4$ and $29_5$ of the roof panels $20_4$ and $20_5$ respectively is shown. The outer skin of the roof panel $20_4$ is thus labeled $32_4$, and the outer skin of the roof panel $20_5$ is similarly labeled $32_5$. The inner skin of the roof panel $20_4$ is likewise labeled $34_4$, and the inner skin of the roof panel $20_5$ is similarly labeled $34_5$. In the illustrated embodiment, a portion $32_5$A of the outer skin $32_5$ of the roof panel $20_5$ extends beyond and along the side $29_5$ of the roof panel $20_5$ that is defined by terminal edges of the core member 30 and the inner skin $34_5$ of the roof panel $20_5$, and the portion $32_5$A of the outer skin $32_5$ will generally be referred to in this description as a skin extension of the roof panel $20_5$. Similarly, a portion $34_4$A of the inner skin $34_4$ of the roof panel $20_4$ extends beyond and along the side $28_4$ of the roof panel $20_4$ that is defined by terminal edges of the core member 30 and the outer skin $32_4$ of the panel $20_4$, and the portion $34_4$A of the inner skin $34_4$ of the roof panel $20_4$ will generally be referred to in this description as a skin extension of the roof panel $20_4$.

In the embodiment illustrated in FIG. 2, a portion $39_4$ of the surface of the core member 30 of the roof panel $20_4$ to which the outer skin $32_4$ is bonded is reduced to define a region $36_4$ of reduced thickness of the panel $20_4$ that extends along and inwardly away from the side $28_4$ of the panel $20_4$. In the illustrated embodiment, for example, the surface of the core member 30 of the roof panel $20_4$ to which the outer skin $32_4$ is bonded defines a downward step or ramp $35_4$ toward the surface of the core member 30 to which the inner skin $34_4$ is bonded, and the step or ramp $35_4$ extends generally parallel to and spaced apart from the side $28_4$ of the panel $20_4$. The region $36_4$ of reduced thickness of the panel $20_4$ is defined between the step or ramp $35_4$ and the side $28_4$ of the roof panel $20_4$. Illustratively, the portion $39_4$ of the surface of the core member 30 of the roof panel $20_4$ is reduced approximately uniformly between the step or ramp $35_4$ and the terminal side $28_4$ of the panel $20_4$ such that the region $36_4$ of reduced thickness of the roof panel $20_4$ defines a region of approximately uniform thickness. The step or ramp $35_4$ may be linear as illustrated in FIG. 2, or may alternatively be piece-wise linear or non-linear, e.g., convex, concave, or the like, and may be configured to step or ramp over any desired distance of the surface of the core member 30 to which the outer skin $32_4$ is bonded, i.e., to provide for a step or ramp that is relatively short, relatively long or somewhere between.

A portion $39_5$ of the surface of the core member 30 of the roof panel $20_5$ to which the inner skin $34_5$ is bonded is likewise reduced to define a region $38_5$ of reduced thickness of the panel $20_5$ that extends along and inwardly away from the side $29_5$ of the panel $20_5$. In the illustrated embodiment, for example, the surface of the core member 30 of the roof panel $20_5$ to which the inner skin $34_5$ is bonded defines a downward step or ramp $35_5$ toward the surface of the core member 30 to which the outer skin $32_5$ is bonded, and the step or ramp $35_5$ extends generally parallel to and spaced apart from the side $29_5$ of the panel $20_5$. The region $38_5$ of reduced thickness of the panel $20_5$ is defined between the step or ramp $35_5$ and the side $29_5$ of the roof panel $20_5$. Illustratively, the portion $39_5$ of the surface of the core member 30 of the roof panel $20_5$ is reduced approximately uniformly between the step or ramp $35_5$ and the terminal side $29_5$ of the panel $20_5$ such that the region $38_5$ of reduced thickness of the roof panel $20_5$ defines a region of approximately uniform thickness. As with the step or ramp $35_4$, the step or ramp $35_5$ may be linear as illustrated in FIG. 2, or may alternatively be piece-wise linear or non-linear, e.g., convex, concave, or the like, and may be configured to step or ramp over any desired distance of the surface of the core member 30 to which the inner skin $34_5$ is bonded, i.e., to provide for a step or ramp that is relatively short, relatively long or somewhere between.

As illustrated in FIG. 2, the panels $20_4$ and $20_5$ are oriented relative to each other such that the sides $28_4$ and $29_5$ abut one another with the skin extension $32_5$A of the outer skin $32_5$ of the roof panel $20_5$ overlapping the region $36_4$ of reduced thickness of the roof panel $20_4$ and with the skin extension $34_4$A of the inner skin $34_4$ of the roof panel $20_4$ overlapping the region $38_5$ of reduced thickness of the roof panel $20_5$. A bonding medium 37 is disposed between the skin extension $32_5$A of the outer skin $32_5$ of the roof panel $20_5$ and the region $36_4$ of reduced thickness of the roof panel $20_4$, and also between skin extension $34_4$A of the inner skin $34_4$ of the roof panel $20_4$ and the region $38_5$ of reduced thickness of the roof panel $20_5$. The bonding medium 37 bonds the skin extension $32_5$A of the outer skin $32_5$ of the roof panel $20_5$ to the outer surface of the outer skin $32_4$ of the roof panel $20_4$ over the region $36_4$ of reduced thickness of the roof panel $20_4$, and also bonds the skin extension $34_4$A of the inner skin $34_4$ of the roof panel $20_4$ to the outer surface of the inner skin $34_5$ of the roof panel $20_5$ over the region $38_5$ of reduced thickness of the roof panel $20_5$.

Illustratively, the skin extension $32_5$A of the outer skin $32_5$ of the roof panel $20_5$ and the region $36_4$ of reduced thickness of the roof panel $20_4$ are both sized such that the skin extension $32_5$A of the outer skin $32_5$ of the roof panel $20_5$ is received within the region $36_4$ of reduced thickness of the roof panel $20_4$; i.e., such that the skin extension $32_5$A of the outer skin $32_5$ of the roof panel $20_5$ is received entirely within the region $36_4$ of reduced thickness of the roof panel $20_4$ with a terminal end $33_5$ of the skin extension $32_5$A positioned at or near a base of the step or ramp $35_4$. Likewise, the skin extension $34_4$A of the inner skin $34_4$ of the roof panel $20_4$ and the region $38_5$ of reduced thickness of the roof panel $20_5$ are both sized such that the skin extension $34_4$A of the inner skin $34_4$ of the roof panel $20_4$ is received within the region $38_5$ of reduced thickness of the roof panel $20_5$; i.e., such that the skin extension $34_4$A of the inner skin $34_4$ of the roof panel $20_4$ is received entirely within the region $38_5$ of reduced thickness of the roof panel $20_5$ with a terminal end $37_4$ of the skin extension $34_4$A positioned at or near a base of the step or ramp $35_5$.

Further illustratively, the thickness of the core member 30 in the region $36_4$ of reduced thickness of the roof panel $20_4$ is selected to be approximately equal to the combined thickness of the skin extension $32_5$A of the outer skin $32_5$ of the roof panel $20_5$ and the bonding medium 37. Thus, when the inner surface of the skin extension $32_5$A of the outer skin $32_5$ of the roof panel $20_5$ is bonded to the outer surface of the outer skin $32_4$ of the roof panel $20_4$ over the region $36_4$ of reduced thickness of the roof panel $20_4$, the outer surfaces of the outer skin $32_5$, the skin extension $32_5$A and the outer skin $32_4$ adjacent to the region $36_4$ of reduced thickness of the roof panel $20_4$ are approximately flush with each other as illustrated in FIG. 2. Likewise, the thickness of the core member 30 in the region $38_5$ of reduced thickness of the roof panel $20_5$ is illustratively selected to be approximately equal to the combined thickness of the skin extension $34_4$A of the inner skin $34_4$ of the roof panel $20_4$ and the bonding medium 37. Thus, when the inner surface of the skin extension $34_4$A of the inner skin $34_4$ of the roof panel $20_4$ is bonded to the outer surface of the inner skin $34_5$ of the roof panel $20_5$ over the region $38_5$ of reduced thickness of the roof panel $20_5$, the outer surfaces of the inner skin $34_4$, the skin extension $34_4$A and the inner skin $34_5$ adjacent to the region $38_5$ of reduced thickness of the roof panel $20_5$ are approximately flush with each other as also illustrated in FIG. 2. Thus, except for the small gaps that may exist between the end $33_5$ of the skin extension $32_5$A and the top of the step or ramp $35_4$ and between the end $37_4$ of the skin extension $34_4$A and the top of the step or ramp $35_5$, the inner and outer surfaces of the roof panels $20_4$ and $20_5$ are substantially flush with each other. Alternatively, embodiments are contemplated in which only one or the other of the inner and outer surfaces of the roof panels $20_4$ and $20_5$ are configured to be substantially flush with each other.

In one embodiment the bonding medium 37 may be a formable bonding medium that cures to a hardened state. In one specific embodiment, the formable medium may be or include a conventional adhesive. For example, the formable medium may be provided in the form of a two-part epoxy or acrylic adhesive that cures to a hardened state after mixing the two parts together in a conventional manner. Alternatively, the formable bonding medium may be or include a conventional sealing medium or other conventional bonding medium. In an alternate embodiment, the bonding medium 37 may be provided in the form of strips of a double-sided adhesive tape wherein one or more strips are positioned between the first skin extension and the second region of reduced thickness, and one or more other strips are positioned between the second skin extension and the first region of reduced thickness.

Alternative panel joining structures and/or techniques may be used to join together the roof panels $20_1$-$20_N$, and examples of some such alternative panel joining structures and/or techniques are set forth in U.S. Pat. No. 4,940,279, the disclosure of which is incorporated herein by reference. It will be understood, however, that joining the various roof panels $20_1$-$20_N$ should not be limited to the shiplap joining technique just described and/or the structures and techniques illustrated in the '279 patent, and that this disclosure further contemplates using other conventional structures and/or techniques for joining together the various roof panels $20_1$-$20_N$. For example, conventional attachment structures, e.g., logistics rails or strips, may be used to attach abutting edges of the roof panels $20_1$-$20_N$ together. Other examples will occur to those skilled in the art, and such other examples are contemplated by this disclosure.

Figure 5:
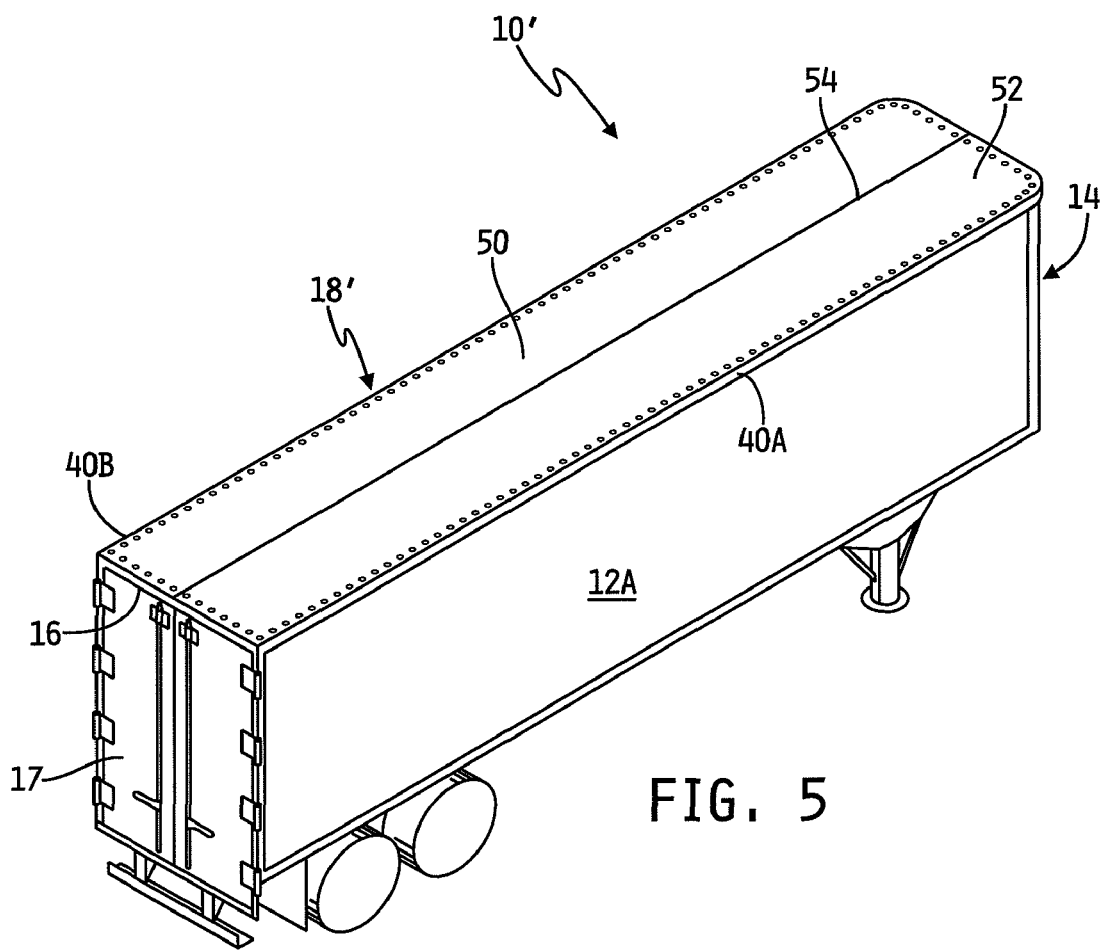
FIG. 5 is a perspective view of another illustrative embodiment of a roof assembly for a trailer.

Those skilled in the art will recognize that while the roof panels $20_1$-$20_N$ have been shown and described as being positionable in side-by-side relationship to form a trailer roof assembly with joints between each adjacent pair of roof panels that extend generally orthogonally between the top rails 40A and 40B (see FIG. 1), two or more of the roof panels may be alternatively configured such that joints between such roof panels extend parallel with, or with some other orientation relative to, the top rails 40A and 40B. As illustrated in FIG. 5, for example, one alternate roof assembly 18' of an alternate embodiment of a trailer 10' may include two elongated roof panels 50 and 52 that are attached to the top rails 40A and 40B respectively and that define a single joint 54 between the roof panels 50 and 52 that extends generally parallel with the top rails 40A and 40B. The joint 54 may be formed using any of the techniques described hereinabove.

Figure 3:
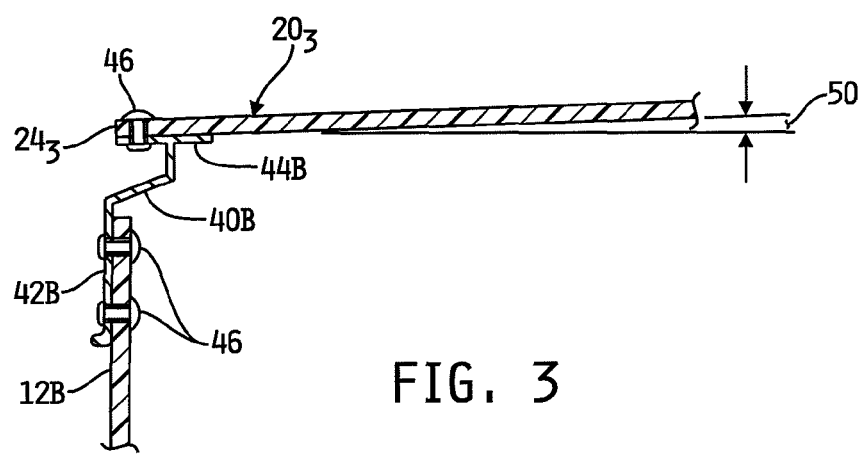
FIG. 3 is a cross-sectional view of the roof assembly as viewed along section lines 3-3 of FIG. 1.

Referring now to FIG. 3, a cross-sectional view of the roof assembly 18, as viewed along section lines 3-3 of FIG. 1, is shown to illustrate mounting or attaching of the ends $22_1$-$22_N$ and $24_1$-$24_N$ of the roof panels $20_1$-$20_N$ to the top rails 40A and 40B respectively of the trailer 10. In the illustrated embodiment, the side wall 12B of the trailer 10 is attached or mounted to a portion 42B of the top rail 40B via a number of conventional fixation members, e.g., rivets, threaded bolt/nut combinations or the like. The end $24_3$ of the roof panel $20_3$ is likewise shown as being attached or mounted to another portion 44B of the top rail 40B via a number (only one shown) of conventional fixation members, e.g., rivets, threaded bolt/nut combinations or the like. Alternatively or additionally, the ends $22_1$-$22_N$ and $24_1$-$24_N$ of the roof panels $20_1$-$20_N$ may be bonded to the top rails 40A and 40B respectively of the trailer 10 via a conventional bonding medium, e.g., adhesive or other bonding medium.

Figure 4:
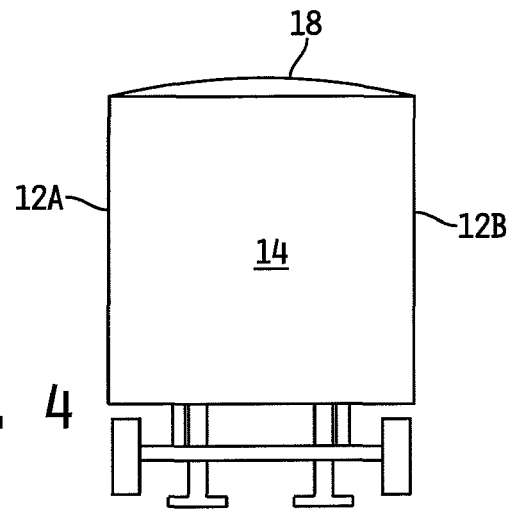
FIG. 4 is a rear elevational view of the roof assembly mounted of FIG. 1.

At least a portion of each of the roof panels $20_1$-$20_N$ between the opposite ends $22_1$-$22_N$ and $24_1$-$24_N$ is configured to extend above each of the opposite ends $22_1$-$22_N$ and $24_1$-$24_N$ when secured to the opposing side walls 12A and 12B respectively of the trailer 10, e.g., when secured to the top rails 40A and 40B respectively. In the embodiment illustrated in FIG. 3, for example, the roof panel $20_3$ is non-flat, as illustrated at 50, such that the height of each roof panel $20_1$-$20_N$ relative to the trailer 10 increases toward its center. Illustratively, each of the roof panels $20_1$-$20_N$ may increase in height, relative to the trailer 10, either linearly or non-linearly toward its center or alternatively toward some other line or contour defined between the two opposite ends $22_1$-$22_N$ and $24_1$-$24_N$ thereof. In the embodiment illustrated in FIG. 4, for example, which is a rear elevational view of the trailer and roof assembly with the rear frame 16 removed, each of the roof panels $20_1$-$20_N$ is bowed such that the roof assembly 18 is generally dome-shaped between the trailer side walls 12A and 12B. It will be understood, however, that FIG. 4 is provided only by way of example, and that the roof panels $20_1$-$20_N$ may alternatively shaped or contoured such that the roof assembly 18 forms other profiles. Example roof assembly profiles include, but should not be limited to, triangular or inverse V-shaped, D-shaped, C-shaped, or the like. While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A roof assembly for a storage container having two opposing side walls that together define a length of the storage container, the roof assembly comprising a plurality of roof panels arranged atop and between the two opposing side walls along the length of the storage container in side-by-side relationship, each of the plurality of roof panels having opposite sides and opposite ends, each of the opposite ends of the plurality of roof panels configured to be secured to a top of a corresponding one of the two opposing side walls, each of the opposite sides of each of the plurality of roof panels configured to be attached to the side of an adjacent one of the plurality of roof panels wherein the storage container further includes a first top rail attached to one of the opposing side walls of the storage container along the to thereof and a second to rail attached to the other of the opposing side walls of the storage container along the top thereof, and wherein the opposite ends of each of the plurality of roof panels are configured to be mounted to a corresponding one of the first and second top rails, and further wherein each of the plurality of roof panels comprises a core member, a first skin on one surface of the core member and a second skin on an opposite surface of the core member, and abutting sides of adjacent ones of the plurality of roof panels each include a region of reduced thickness of the core member.

2. The roof assembly of claim 1 wherein a portion of each of the plurality of roof panels between the opposite ends thereof extends above each of the opposite ends when secured to the opposing side walls of the storage container.

3. The roof assembly of claim 1 wherein the storage container has a front wall connected between the two opposing side walls at one end thereof and a rear frame connected between the two opposing side walls at an opposite end thereof, and further comprising a front end roof panel having a first side secured to the side of one of the plurality of roof panels and a second side positioned adjacent to a top of the front wall and configured to be secured to the top of the front wall, and further comprising a rear end roof panel having a first side secured to the side of one of the plurality of roof panels and a second side positioned adjacent to a top of the rear frame and configured to be secured to the top of the rear frame.

4. The roof assembly of claim 3 wherein a portion of each of the plurality of roof panels between the opposite ends thereof extends above each of the opposite ends when secured to the opposing side walls of the storage container.

5. The roof assembly of claim 4 wherein each of the plurality of roof panels is bowed between the opposite ends thereof such that the roof assembly is substantially dome-shaped along a longitudinal axis defined by the storage container centrally between the two opposing side walls of the storage container.

6. The roof assembly of claim 3 wherein the second side of the front end roof panel is configured to be secured to the top of the front wall via a number of fixation members.

7. The roof assembly of claim 6 wherein the number of fixation members comprise rivets.

8. The roof assembly of claim 3 wherein the second side of the front end roof panel is configured to be secured to the top of the front wall via a bonding medium.

9. The roof assembly of claim 8 wherein the bonding medium comprises adhesive.

10. The roof assembly of claim 1 wherein the opposite ends of each of the plurality of roof panels is configured to be mounted to a corresponding one of the first and second top rails via a number of fixation members.

11. The roof assembly of claim 10 wherein the number of fixation members comprise rivets.

12. The roof assembly of claim 1 wherein the opposite ends of each of the plurality of roof panels is configured to be mounted to a corresponding one of the first and second top rails via a bonding medium.

13. The roof assembly of claim 12 wherein the bonding medium comprises adhesive.

14. The roof assembly of claim 1 wherein abutting sides of adjacent ones of the plurality of roof panels are configured to be attached together by overlapping the first skin along the adjacent side of one of the adjacent roof panels onto the other adjacent roof panel and overlapping the second skin along the adjacent side of the other adjacent roof panel onto the one of the adjacent roof panels.

15. The roof assembly of claim 14 wherein the first skin along the adjacent side of the one of the adjacent roof panels is bonded to the other adjacent roof panel and the second skin along the adjacent side of the other adjacent roof panel is bonded to the one of the adjacent roof panels.

16. The roof assembly of claim 1 further comprising a number of attachment structures each attached to abutting sides of adjacent ones of the plurality of roof panels to thereby attach the sides of the plurality of roof panels together.

17. The roof assembly of claim 1 wherein the storage container comprises a transportable storage container configured to store one or more objects therein.

18. The roof assembly of claim 17 wherein the storage container comprises one of a towable trailer and a straight truck body.

19. The roof assembly of claim 1 wherein at least one of the top surface and the bottom surface of at least one of the plurality of roof panels includes one or more embossments.

20. The roof assembly of claim 14 wherein abutting sides of adjacent ones of the plurality of roof panels are configured to be attached together such that the first skin of the adjacent side of one of the adjacent roof panels is positioned adjacent the region of reduced thickness of the core member of the other adjacent roof panel.

21. The roof assembly of claim 1, wherein a thickness of the roof assembly at abutting sides of adjacent ones of the plurality of roof panels is substantially the same as a thickness of the roof assembly at a middle portion of each one of the plurality of roof panels such that a generally smooth exterior surface of the roof assembly is formed.

22. The roof assembly of claim 1 wherein a thickness of the first skin and a thickness of the second skin of each of the plurality of roof panels is substantially the same along a width of each roof panel.

* * * * *